United States Patent
Phong et al.

(10) Patent No.: US 10,002,093 B1
(45) Date of Patent: Jun. 19, 2018

(54) CONFIGURING MULTI-LINE SERIAL COMPUTER EXPANSION BUS COMMUNICATION LINKS USING BIFURCATION SETTINGS

(71) Applicant: Western Digital Technologies, Inc., Irvine, CA (US)

(72) Inventors: San A Phong, Cerritos, CA (US); John E. Maroney, Irvine, CA (US)

( * ) Notice: Subject to any disclaimer, the term of this patent is extended or adjusted under 35 U.S.C. 154(b) by 363 days.

(21) Appl. No.: 14/740,144

(22) Filed: Jun. 15, 2015

Related U.S. Application Data (60) Provisional application No. 62/154,247, filed on Apr. 29, 2015.

(51) Int. Cl.
  *G06F 13/36* (2006.01)
  *G06F 13/38* (2006.01)
  *G06F 13/42* (2006.01)
  *G06F 13/40* (2006.01)
  *G06F 13/28* (2006.01)

(52) U.S. Cl.
  CPC ............ *G06F 13/385* (2013.01); *G06F 13/28* (2013.01); *G06F 13/4081* (2013.01); *G06F 13/4221* (2013.01)

(58) Field of Classification Search
  USPC .................................. 710/104–110, 305–317
  See application file for complete search history.

(56) References Cited

U.S. PATENT DOCUMENTS

| | | | |
|---|---|---|---|
| 7,701,705 B1 | 4/2010 | Szeremeta | |
| 7,705,850 B1 | 4/2010 | Tsu | |
| 8,064,194 B2 | 11/2011 | Szeremeta | |
| 8,113,873 B1 | 2/2012 | Sarraf | |
| 8,133,426 B1 | 3/2012 | Yurchenco et al. | |
| 8,358,395 B1 | 1/2013 | Szeremeta | |
| 8,417,979 B2 | 4/2013 | Maroney | |
| 8,462,460 B1 | 6/2013 | Szeremeta et al. | |
| 8,498,088 B1 | 7/2013 | Klein | |
| 8,543,752 B2 | 9/2013 | Cong et al. | |
| 8,547,658 B1 | 10/2013 | Szeremeta | |
| 9,501,438 B2 * | 11/2016 | Tokumitsu | G06F 13/36 |
| 2007/0011383 A1 * | 1/2007 | Berke | G06F 13/4022 710/301 |
| 2010/0161838 A1 * | 6/2010 | Daniel | G06F 13/385 710/8 |
| 2012/0260015 A1 * | 10/2012 | Gay | G06F 13/409 710/301 |
| 2012/0271961 A1 * | 10/2012 | Alshinnawi | G06F 13/387 709/230 |
| 2013/0111117 A1 * | 5/2013 | Yang | G06F 3/061 711/103 |

(Continued)

*Primary Examiner* — Raymond Phan
(74) *Attorney, Agent, or Firm* — Chang & Hale LLP (57) ABSTRACT

Systems and methods are disclosed for configuring multi-line serial computer expansion bus communication links. A controller for a data storage device may receive one or more signals indicative of bifurcation settings from a configuration component or a host bus adapter may provide one or more signals indicative of bifurcation settings to the controller. The controller may receive configuration data from the BIOS based on the one or more signals and may configure the multi-line serial computer expansion bus communication links based on the configuration data.

23 Claims, 7 Drawing Sheets

(56) References Cited

U.S. PATENT DOCUMENTS

| | | | | |
|---|---|---|---|---|
| 2013/0339594 A1* | 12/2013 | Math | ................ | G11C 5/141 |
| | | | | 711/105 |
| 2014/0108699 A1* | 4/2014 | Yang | ................ | G06F 3/061 |
| | | | | 710/316 |
| 2015/0347349 A1* | 12/2015 | Raindel | ............ | G06F 15/17331 |
| | | | | 710/308 |

* cited by examiner

CONFIGURING MULTI-LINE SERIAL COMPUTER EXPANSION BUS COMMUNICATION LINKS USING BIFURCATION SETTINGS

CROSS-REFERENCE TO RELATED APPLICATION

This application claims priority to provisional U.S. Patent Application Ser. No. 62/154,247, filed on Apr. 29, 2015, which is hereby incorporated by reference in its entirety.

BACKGROUND

Distribution of data storage across one or more data storage devices can provide increased data security through data redundancy. One type of data storage device may be a direct-attached storage (DAS) device. DAS devices may provide one or more computing devices with direct access to data via a connection cable (e.g., via a direct or physical connection). Another type of data storage device may be a network-attached storage (NAS) device. NAS devices may provide access to data over computer networks (e.g., via a wired and/or wireless network).

BRIEF DESCRIPTION OF THE DRAWINGS

Various embodiments are depicted in the accompanying drawings for illustrative purposes, and should in no way be interpreted as limiting the scope of this disclosure. In addition, various features of different disclosed embodiments can be combined to form additional embodiments, which are part of this disclosure.

DETAILED DESCRIPTION

While certain embodiments are described, these embodiments are presented by way of example only, and are not intended to limit the scope of protection. Indeed, the novel methods and systems described herein may be embodied in a variety of other forms. Furthermore, various omissions, substitutions and changes in the form of the methods and systems described herein may be made without departing from the scope of protection.

The headings provided herein are for convenience only and do not necessarily affect the scope or meaning of the claimed invention. Disclosed herein are example implementations, configurations, and/or embodiments relating to receiving and/or processing data access requests for a data storage device.

Overview

Data storage devices/systems may provide one or more computing devices with file-level data storage. One example of a data storage device/system may be a DAS device. The DAS device may be coupled to a computing device (e.g., a laptop computer, a desktop computer, etc.) via a connection cable (e.g., a Thunderbolt cable, an external serial advanced technology attachment (eSATA) cable, a universal serial bus (USB) cable, etc.) coupled to a DAS interface (e.g., a communication interface such as USB, Thunderbolt, etc.) of the DAS device. A DAS device may provide a convenient mechanism for transferring data between computing devices, increasing the storage capacity (e.g., increase the storage space) of a computing device, and/or providing increased data security through data redundancy. Another example of a data storage device/system may be a NAS device. A NAS device may be coupled to a network via a NAS interface (e.g., a network interface such as Ethernet, 802.11 (Wi-Fi), etc.). A NAS device may provide file-level data storage over a network (e.g., a computer network), wherein access to the stored data is accessible to a group of clients. For example, a NAS device may include hardware, software, or a combination of such elements, configured such that the NAS device operates as a file server. NAS devices/systems can provide a convenient mechanism for sharing data among multiple computers and/or remotely accessing data stored on the NAS devices/systems. As compared to traditional file servers, benefits of NAS devices/systems may include the ability to access data from various locations (e.g., remote locations), faster data access, easier administration, and/or simpler configuration.

Certain embodiments disclosed herein provide the ability for a data storage device to communicate with multiple devices (e.g., multiple peripheral component interconnect express (PCIe) based devices) via a single connector (e.g., via a single PCIe connector). The data storage device may communicate with the multiple devices simultaneously (e.g., transmit/receive data to and from the multiple devices simultaneously).

While certain embodiments are disclosed herein in the context of the peripheral component interconnect express (PCIe) interface (e.g., a bus/communication interface), the embodiments, implementations, examples, and/or principles disclosed herein may be applicable to any suitable or desirable bus/communication interface. For example, the embodiments, implementations, examples, and/or principles disclosed herein may be applicable to any multi-line computer bus/communication interface (e.g., any multi-line serial computer expansion bus/communication interface).

Data Storage Devices

Figure 1:
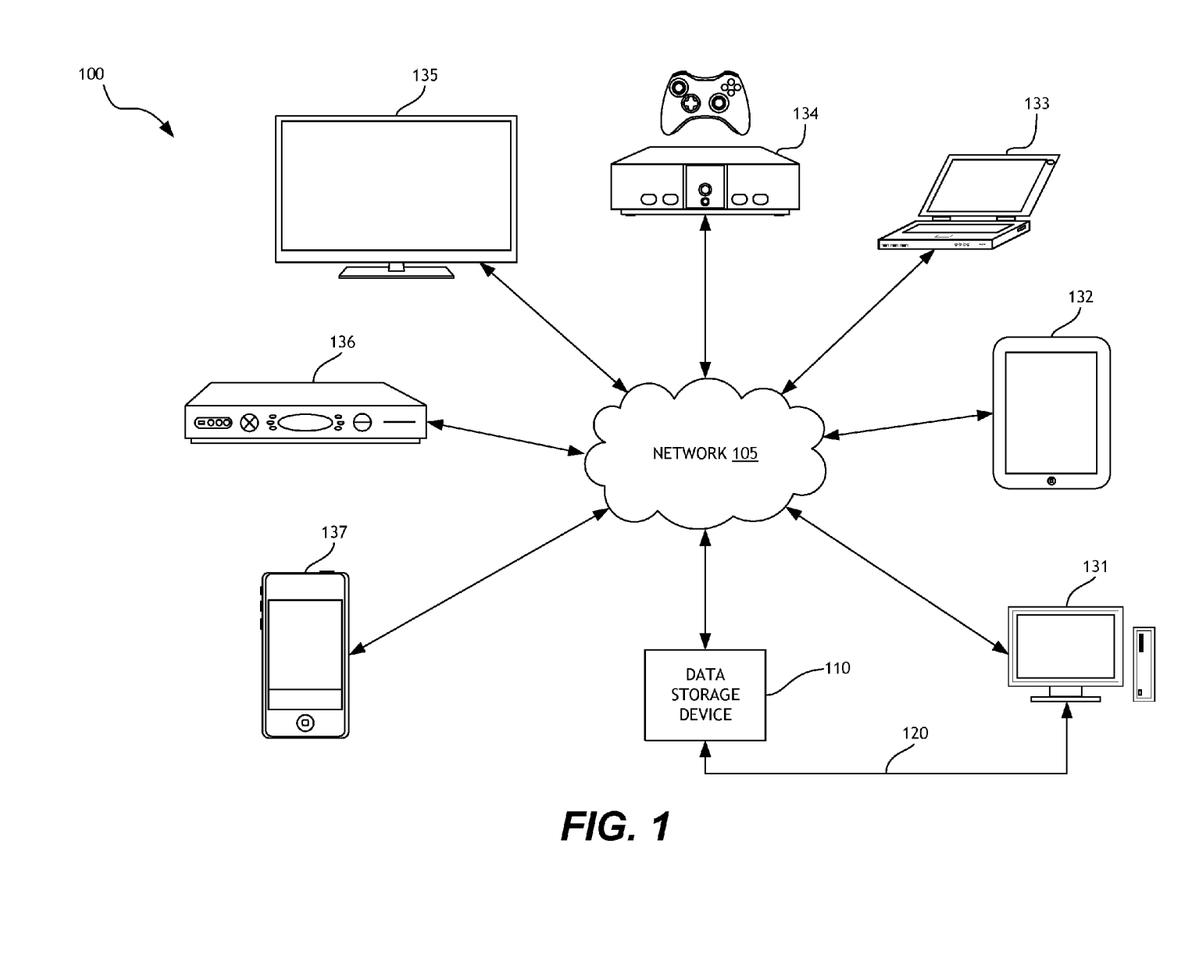
FIG. 1 is a diagram of a data storage system, according to an embodiment.

FIG. 1 is a diagram of a data storage system 100, according to an embodiment. In the data storage system 100 a data storage device 110 may be communicatively coupled to one or more client devices (e.g., computing devices) in order to provide file-based data storage services to the one or more client devices (e.g., one or more computing devices). Types of client devices (e.g., computing devices) that may have access to the data storage device 110 may include, but are not limited to, phones 137 (e.g., smart phones, cellular phones, etc.), cable set-top boxes 136, smart TV's 135, video game consoles 134, laptop computers 133, tablet computers 132, desktop computers 131, wearable computers and/or other types of computing devices.

The data storage device 110 device may provide various client devices (e.g., phones 137, cable set-top boxes 136, smart TV's 135, video game consoles 134, laptop computers 133, tablet computers 132, desktop computers 131) with access to various types of user data stored on the data storage device 110. The data storage device 110 may also allow users to store various types of user data on the data storage device 110. The data storage device 110 may comprise magnetic media, hard disk media, and/or solid-state media.

With further reference to FIG. 1, the data storage device 110 (e.g., magnetic disk drive, hybrid hard drive, solid-state drive, etc.) may include a controller (not shown in FIG. 1) configured to receive data commands and to execute such commands in one or more non-volatile memory components of the data storage device 110. Such commands may include data read/write commands, and the like. The controller may be configured to receive data commands from a communication interface residing on a computing device. Data commands may specify a block address in the data storage device 110 and data may be accessed/transferred based on such commands. The data commands may also be referred to as data access requests.

The data storage device 110 may be configured to store data in one or more magnetic recording disks and/or the solid state memory devices/arrays. In an embodiment, the data storage device 110 may comprise a cable box, a backup disk drive, a media storage unit, a streaming media device, a digital camera, or any other electronic device which may store data that may need to be accessed directly or wirelessly.

In certain embodiments, the data storage device 110 may store data received from a client device such that the data storage device 110 acts as data storage for the client device. To facilitate this function, the data storage device 110 may implement a logical interface. The logical interface can present to the client device memory as a set of logical addresses (e.g., sequential/contiguous addresses) where data may be stored. Internally, the controller may map logical addresses to various physical memory addresses in the non-volatile memory of the data storage device 110. Mapping data indicating the mapping of logical addresses to physical memory addresses may be maintained in the data storage device 110.

In one embodiment, the data storage device 110 may be a DAS device. The DAS device may be directly coupled to client device (e.g., a desktop computer 131) via connection cable 120. The connection cable 120 may be coupled to a communication interface (e.g., a USB interface, a Thunderbolt interface, etc.) of the DAS device (e.g., data storage device 110). In another embodiment, the data storage device 110 may also be a NAS device. The NAS device may also be coupled to the client devices (e.g., computing devices) 131-137 via a network 105. The NAS device may be coupled to the network 105 via a network interface (e.g., an Ethernet interface, an 802.11 (Wi-Fi) interface, etc.). Each of the client devices 131-137 may also be coupled to the network 105 via a network interface. In one embodiment, network 105 may include a public network (e.g., the Internet), a private network (e.g., a local area network (LAN)), a wide area network (WAN) such as the Internet, a wired network (e.g., Ethernet network), a wireless network (e.g., an 802.11 network or a Wi-Fi network), a cellular network (e.g., a Long Term Evolution (LTE) network), routers, hubs, switches, server computers, other types of computer networks, and/or a combination thereof.

In one embodiment, the data storage device 110 may receive data access requests from the client devices 131-137 via the communication interface (e.g., a DAS interface such as USB, Thunderbolt) and/or via the network interface (e.g., Ethernet, 802.11, etc.). The data access requests may be messages, commands, and/or requests to access data on the data storage device. For example, a data access request may indicate that a computing device wants to read data from the data storage device 110. In another example, a data access request may indicate that a computing device wants to write data to the data storage device 110.

Although data storage devices/drives/systems may provide various benefits, as described above, in certain configurations, such systems may be associated with various issues and/or drawbacks. A data storage device may include multiple devices (e.g., multiple PCIe based devices, such as a PCIe based system on chip (SOC)). The multiple devices may communicate data with a controller of the data storage device via one or more connectors (e.g., multi-line serial computer expansion bus/communication connectors such as PCIe connectors). A multiplexer or a switch may be used to allow the multiple devices to communicate with the controller. However, a multiplexer or switch may be more costly, may use or consume more power, may increase design complexity, and/or may reduce the performance of the data storage device (e.g., due to the latency in switching between the multiple devices). Multiple host bus adapters (HBAs) may be used to allow the multiple devices to communicate with the controller. However, multiple HBAs may be more costly, may use or consume more power, and/or may increase design complexity. In addition, multiple HBAs may reduce the amount of air flow in the data storage device and/or increase the amount of heat generated by the data storage device.

The data storage device may divide or bifurcate the connector such that multiple communication links (one for each of the multiple devices) may use the same connector. Bifurcation settings (e.g., the number of communication links, the bandwidth of each communication link, etc.) may be stored in a read-only memory (ROM) of the data storage device. However, the ROM may increase the cost of the data storage device, use more power, and/or may increase the design complexity of the data storage device. In addition, the data storage device may need a system management bus (SMBus) interface in order to read the bifurcation settings from the ROM. Many data storage devices may not include a SMBus interface and the use of a SMBus interface may delay the startup of the data storage device.

It may be useful to provide a data storage device that allows multiple devices (e.g., multiple PCIe based SOCs) to communicate with the data storage device via a single connector (e.g., via a single connector). Certain embodiments disclosed herein provide the ability for the data storage device 110 to communicate with PCIe based devices and/or other devices via a single PCIe connector without using a ROM, multiplexer/switch, or multiple HBAs. The ability to communicate with the PCIe based devices via a single PCIe connector without using a ROM, a multiplexer/switch, or multiple HBAs may reduce the cost to manufacture the data storage device, the amount of space (e.g., chassis space) used by the data storage device, the amount of power used by the data storage device, and/or the complexity of the wiring of the data storage device.

In one embodiment, a controller may receive one or more signals from one or more lines (e.g., signal or data lines) that are coupled to a PCIe configuration component. The one or more signals may indicate bifurcation settings for a PCIe connector (e.g., for a single PCIe connector or a multi-line serial computer expansion bus connector). The controller may receive configuration data (e.g., may select and/or retrieve the configuration data) from a basic input/output system (BIOS) coupled to the controller, based on the one or more signals. The configuration data may indicate how the controller should configure a plurality of communication links to communicate data via the PCIe connector. The controller may configure the plurality of communication links based on the configuration data.

In another embodiment, an HBA may apply one or more signals to one or more lines of a PCIe connector (e.g., a multi-line serial computer expansion bus connector). The one or more signals may be indicative of bifurcation settings for a PCIe connector. The HBA may provide the one or more signals to a controller of a data storage device. The HBA may communicate data between the controller and a plurality of devices and/or PCIe based devices via the PCIe connector.

Configuring Multi-Line Serial Computer Expansion Bus Communication Links

Figure 2:
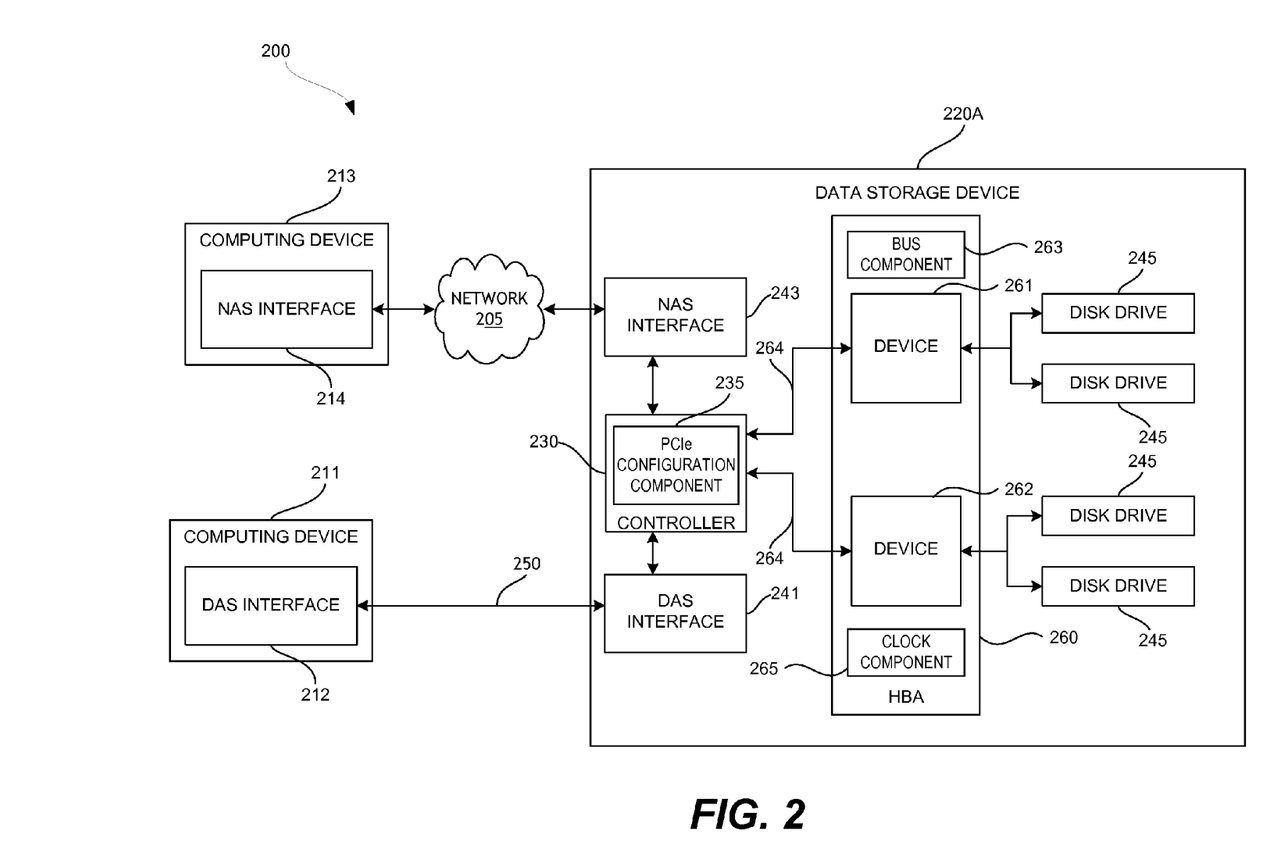
FIG. 2 is a diagram of a data storage system, according to an embodiment.

FIG. 2 is a diagram of a data storage system 200 according to an embodiment. The data storage system 200 includes a computing device 211, a computing device 213, a connection cable 250, and a data storage device 220A. Each of the computing devices 211 and 213 may be a laptop computer, a desktop computer, a server computer, a tablet computer, a smart phone, a set-top box, a smart TV, a video game console, etc. The data storage device 220A may include a controller 230, a DAS interface 241 (e.g., USB, Thunderbolt, eSATA, etc.), a NAS interface 243 (e.g., Ethernet, Wi-Fi, etc.), and disk drives 245. In one embodiment, the disk drives 245 may include non-volatile magnetic media, and/or solid-state memory, such as NAND flash. For example, the disk drives 245 may be magnetic disk drives, solid state disk drives, and/or hybrid drives (e.g., drives with both magnetic disks and solid state memory). The controller 230 may provide overall control for the data storage device 220A. In certain embodiments, the data storage device 220A may be a hard disk drive. The disk drives 245 may include one or more disks and the data storage device 220A may further include one or more heads (not shown) actuated radially over the disk(s), and a spindle motor for rotating the disk(s). Alternatively to, or in addition to, magnetic rotating media, solid-state memory and/or other non-volatile memory (e.g., MRAM and/or phase change memory) may be used. In certain embodiments, the data storage device 220A may be, for example, a hybrid hard drive including both magnetic media and solid-state media.

The controller 230 may receive data access requests (e.g., data and storage access commands) from a DAS interface 212 (e.g., a USB interface, a Thunderbolt interface) of the computing device 211. Data access requests communicated by the DAS interface 212 may include write and read commands issued by the computing device 211. The data access requests may specify a logical block address (LBA), or range of LBAs, in the data storage device 220A, and the controller 230 may execute the received data access requests in the disk drives 245. The controller 230 may also receive data access request from a NAS interface 214 (e.g., an Ethernet interface, a Wi-Fi interface, etc.) of the computing device 213. The controller may determine an LBA and/or a range of LBAs in the data storage device 220A based on the data access requests and may execute the received data access requests in the disk drives 245. In a hybrid hard drive, data may be stored in a magnetic media storage component as well as non-volatile solid-state memory.

The data storage device 220A may store data received from the computing devices 211 and 213, such that the data storage device 220A acts as memory for the computing devices 211 and 213. To facilitate this memory function, the controller 230 may implement a logical interface (as discussed above). In one embodiment, the data storage device 220A may also be configured to implement data redundancy. For example, the data storage device 220A may implement redundant array of independent disks (RAID) technology where the disk drives 245 and/or portions of the drive may be combined into a logical unit (e.g., a RAID array) for the purposes of data redundancy and performance improvement. In addition, or alternatively, the data storage device may be configured to implement RAID using one or more internal memory modules in combination with one or more external memory devices.

The computing device 211 may be coupled to the data storage device 220A via connection cable 250. The connection cable 250 may directly connect the computing device 211 and the data storage device 220A. The connection cable 250 may use one or more communication interfaces (such as a bus interface) and/or protocols that may allow the computing device 211 to communicate with the data storage device 220A. The DAS interfaces 212 and 241 may be USB interfaces, Thunderbolt interfaces, serial attached SCSI (SAS), eSATA interface, etc.

In one embodiment, the connection cable 250 may include one or more data lines (e.g., one or more wires, pins, traces, etc.) that allow the computing device 211 to communicate data with the data storage device 220A. The computing device 211 may communicate data to and from the data storage device using the DAS interface 212 (e.g., via the DAS interface 212). In another embodiment, the computing device 211 may provide an input voltage to the data storage device 220A and the data storage device 220A may use the input voltage to operate one or more components of the data storage device 220A (e.g., the controller 230, the disk drives 245, etc.). In a further embodiment, the data storage device 220A may be coupled to a separate power source (e.g., may be coupled to a battery, to an AC adaptor, to a wall outlet, etc.).

In one embodiment, the connection cable 250 may include a bridge unit (not shown in FIG. 2). For example, the connection cable 250 may include a USB bridge, a Thunderbolt bridge, or other type of bridge. The bridge unit may translate between two different types of communication interfaces and/or protocols. For example, if a connected storage device communicates in a first protocol, but not a second protocol, the bridge unit may translate the second protocol to the first protocol, or vice versa.

The computing device 213 may be communicatively coupled to the data storage device 220A via a network 205 (e.g., one or more of a Wi-Fi network, a LAN, a cellular network, etc.). The computing device 213 may send data (e.g., files, images, movies, etc.) and/or data access requests to the data storage device 220A via the NAS interface 214 (e.g., an Ethernet interface, a Wi-Fi interface, etc.) and the network 205. The data storage device 220A may receive the data and/or data access requests from the computing device 213 via the NAS interface 243.

The controller 230 may be coupled to an HBA 260 via a PCIe connector (e.g., via a single PCIe connector). For example, the HBA 260 may be plugged into a PCIe connector (e.g., a multi-line serial computer expansion bus connector, a PCIe slot, etc.) of the data storage device 220A. The HBA includes devices 261 and 262. In one embodiment, the devices 261 and 262 may each be PCIe based devices, such as PCIe based SOCs. The controller 230 may communicate data with devices 261 and 262 via PCIe links 264. The PCIe links 264 may use the PCIe connector to communicate data between the controller 230 and the devices 261 and 262. The PCIe links 264 may be examples of communication links. A communication link may be one or more wires, lines, traces, pins, etc., that may be used to communicate data (e.g., transfer/receive data). In one embodiment, the devices 261 and/or 262 may communicate data between the controller 230 and the disk drives 245. For example, the devices 261 and 262 may be configured to communicate (e.g., transmit and/or receive) data with disk drives 245 via serial AT attachment (SATA) interfaces. In another embodiment, the devices 261 and/or 262 may control the operation of the disk drives 245. For example, the devices 261 and/or 262 may power up, power down, and/or monitor the operation of the disk drives 245.

In one embodiment, one or more of the devices 261 and/or 262 may implement RAID for one or more of the disk drives 245. For example, one or more disk drives 245 may form a RAID array. The device 261 may be configured to divide and replicate user data among the physical RAID drives, providing storage virtualization. The RAID array may be accessed by the computing devices 211 and 213 as a single drive. Data may be distributed across the RAID drives according to any desirable or practical RAID level, depending on the level of redundancy and/or performance desired. For example, the device 261 may be configured to implement RAID 0, RAID 1, RAID 5, RAID 6, RAID 10, other RAID technology, or other erasure coding technology, depending on data reliability, availability, performance and/or capacity considerations or requirements. In one embodiment, the device 261 may be capable of implementing RAID and the device 262 may not be capable of implementing RAID. This may allow for a reduction in the cost of the data storage device 220A because the device 262 may be cheaper (to manufacture and/or buy) than the device 262 (due to the lack of RAID functionality).

The controller 230 includes a PCIe configuration component 235. In one embodiment, the PCIe configuration component 235 may apply one or more signals to one or more lines (e.g., signal or data lines) coupled to the controller 230 of the data storage device 220A. In one embodiment, the PCIe configuration component 235 may be separate from the controller 230. The one or more signals may indicate bifurcation settings for the PCIe connector. In one embodiment, the one or more signals may represent or form a bit sequence/value. The bit sequence/value may indicate a number of PCIe links and/or a number of PCIe lanes for each PCIe link (e.g., 2 PCIe links with 4 lanes in each PCIe link). For example, the one or more signals may form the bit sequence/value "00011" and the bit sequence/value "00011" may indicate the number of PCIe links and/or the number of PCIe lanes for each PCIe link. In another embodiment, the number of the one or more signals may indicate a number of PCIe links and/or a number of PCIe lanes for each PCIe link. For example, if there are three signals applied to the one or more lines, the number of signals (e.g., three) may indicate a number of PCIe links and/or a number of PCIe lanes for each PCIe link. The bifurcation settings (e.g., the number of PCIe links and/or number of PCIe lanes for each PCIe link) may be based on the number of drives coupled to the devices 261 and 262. For example, if there are two disk drives 245 coupled to the device 261 and two disk drives 245 coupled to the device 262, and the PCIe connector is a PCIe x8 connector, the bifurcation settings may indicate that there should be two PCIe links and each PCIe link should have four PCIe lanes. Although the present disclosure may refer to PCIe links and/or PCIe lanes, the embodiments, examples, and/or implementations described herein may be applicable to any type of communication link with a configurable bandwidth (e.g., with a configurable number of lanes, lines, pins, traces, wires, etc.).

The controller 230 may select and/or retrieve configuration data from the BIOS based on the one or more signals received from the PCIe configuration component 235. The controller 230 and/or the PCIe configuration component 235 may configure the PCIe links and/or PCIe lanes based on the configuration data. For example, the configuration data may indicate how the controller 230 should configure the PCIe connector to support the number of PCIe links (each with a number of PCIe lanes) indicated by the one or more signals (e.g., indicated by the bifurcation settings). For example, the bifurcation settings may indicate that there should be four PCIe links and each PCIe link should have one PCIe lane. The configuration data may include parameters, settings, instructions, and/or commands for the controller 230 and/or the PCIe configuration component 235 to configure the PCIe connector with four PCIe links, each PCIe link with one PCIe lane. Although two devices 261 and 262 are illustrated in FIG. 2, it shall be understood that in other embodiments, the HBA 260 may include more than two devices (e.g., may include four, six, etc., PCIe based SOCs). Furthermore, although four disk drives 245 are illustrated in FIG. 2, it shall be understood that in other embodiments, the data storage device 220A may include any number of disk drives 245.

The HBA 260 includes a bus component 263. In one embodiment, the bus component 263 may facilitate the communication of data between the devices 261 and 262, and the controller 230 via the PCIe links 264. For example, the controller 230 may receive data from computing device 213 and may provide the data to the HBA 260 via a PCIe link 264. The bus component 263 may receive the data on the PCIe link 264 and may provide the data to the device 261 so that the device 261 may write the data to a disk drive 245. In another example, the computing device 211 may read and/or request data from a disk drive 245. The device 262 may read the data from the disk drive 245 and may provide the data to the bus component 263. The bus component 263 may provide the data to the controller 230 (via a PCIe link 264) so that the controller 230 may provide the data to the computing device 213.

In one embodiment, the controller 230 may provide a clock signal to the clock component 265 of the HBA 260 via the PCIe connector (e.g., via one or more clock lines of the PCIe connector). The clock component 265 may distribute the clock signal to the devices 261 and 262. For example, the clock component 265 may be an active clock buffer or a passive clock splitter that may provide the clock signal to the devices 261 and 262. In another embodiment, the controller 230 may provide a reset signal to the HBA 260 via the PCIe connector (e.g., via one or more reset lines of the PCIe connector). The HBA 260 may distribute the reset signal to the devices 261 and 262. For example, the HBA 260 may include another component (not shown in FIG. 2) that may distribute the reset signal to the devices 261 and 262. In a further embodiment, the HBA 260 may receive power (e.g., a voltage) via the PCIe connector. The power received by the HBA 260 may be used operate the devices 261 and/or 262. For example, the devices 261 and/or 262 may be powered by a voltage received by the HBA 260 via the PCIe connector.

In one embodiment, the controller 230 and/or PCIe configuration component 235 may apply the one or more signals to the one or more lines based on one or more jumper settings. For example, the data storage device 220A may include one or more header jumpers and/or jumper shunts. The placement of the jumper shunts on the header jumpers (e.g., jumper settings) may be used to indicate which signals should be transmitted. The controller 230 and/or PCIe configuration component 235 may detect that a combination of jumpers are set (using the jumper shunts) and may select and/or retrieve different configurations (e.g., different bifurcation configurations) for the PCIe connector from the BIOS. For example, the controller 230 and/or PCIe configuration component 235 may read the configuration data from a memory of the BIOS based on the one or more header jumpers and/or jumper shunts. In one embodiment, the controller 230 and/or the PCIe configuration component 235 may include the one or more header jumpers and/or jumper shuts.

Figure 3:
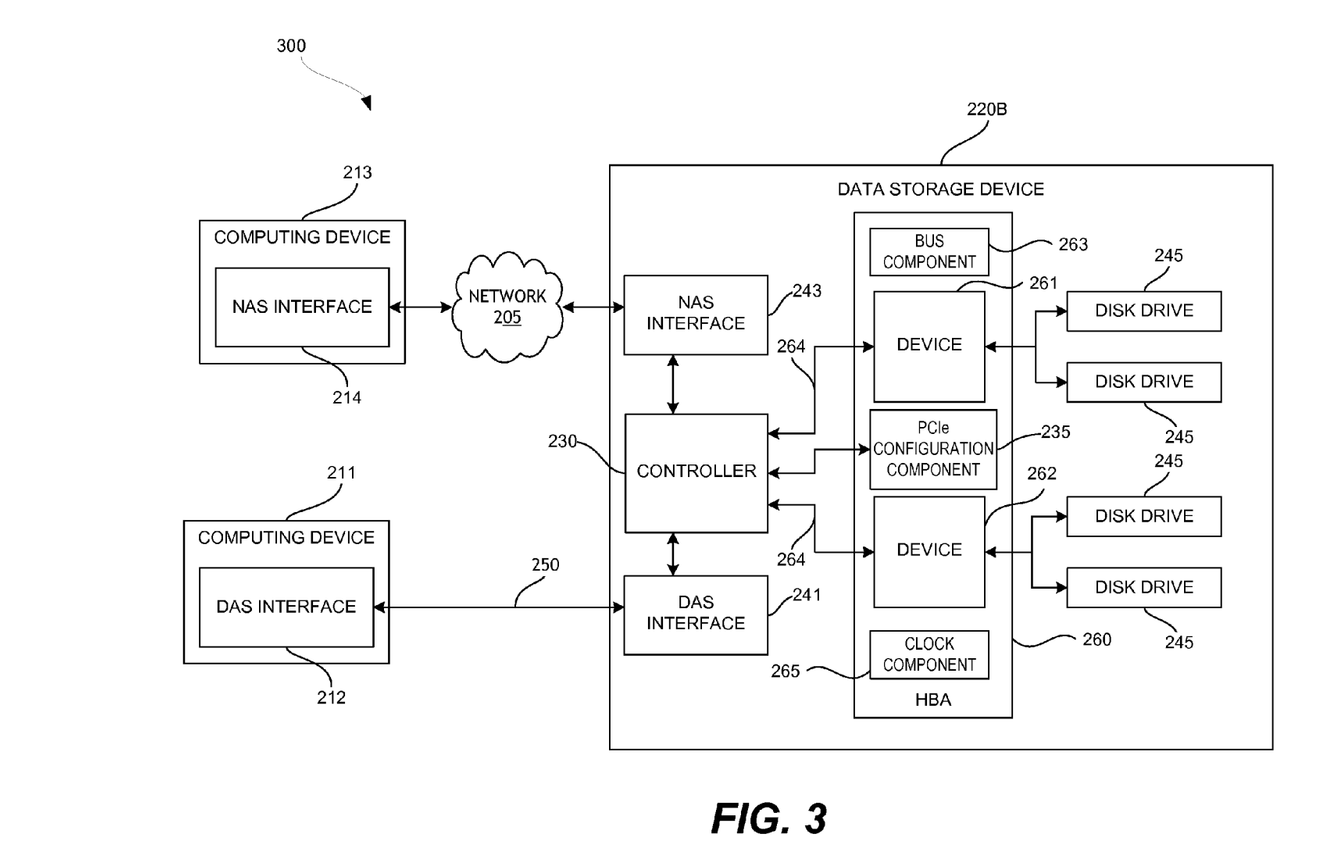
FIG. 3 is a diagram of a data storage system, according to an embodiment.

FIG. 3 is a diagram of a data storage system 300 according to an embodiment. The data storage system 300 includes a computing device 211, a computing device 213, a connection cable 250, and a data storage device 220B. The data storage device 220B may include a controller 230, a DAS interface 241, a NAS interface 243, and disk drives 245. In one embodiment, the disk drives 245 may include non-volatile magnetic media, and/or solid-state memory, such as NAND flash. The controller 230 may provide overall control for the data storage device 220B. The controller 230 may receive data access requests from a DAS interface 241 and/or a NAS interface 243 and may execute the received data access requests in the disk drives 245.

The data storage device 220B may store data received from the computing devices 211 and 213, such that the data storage device 220B acts as memory for the computing devices 211 and 213. To facilitate this memory function, the controller 230 may implement a logical interface. The logical interface may present to the computing devices 211 and 213 the memory of the data storage device 220B as a set of logical addresses. The controller 230 may map logical addresses to various physical memory addresses in the disk drives 245 and/or other memory module(s).

The data storage device 220B may be configured to implement data redundancy, wherein user data stored in the disk drives 245 is maintained in one or more internal and/or external drives. For example, the data storage device 220B may implement redundant array of independent disks (RAID) technology. Data may be distributed across the RAID memory modules/drives according to any desirable or practical RAID level, depending on the level of redundancy, reliability, availability, and/or performance desired.

The computing device 211 may be coupled to the data storage device 220B via connection cable 250. The connection cable 250 may include one or more data lines that allow the computing device 211 to communicate data with the data storage device 220B and/or receive power (e.g., a voltage) from the computing device 211. The connection cable 250 may include a bridge unit (not shown in FIG. 2) that may translate between two different types of communication interfaces and/or protocols. The computing device 213 may be communicatively coupled to the data storage device 220B via a network 205 (e.g., one or more of a wired network, a wireless network, a cellular network, etc.). The computing device 213 may send data access requests to the data storage device 220B via the NAS interface 214.

The controller 230 may be coupled to an HBA 260 via a PCIe connector (e.g., via a single PCIe connector). The HBA includes devices 261 and 262. In one embodiment, the devices 261 and 262 may each be PCIe based devices such as PCIe based SOCs. The controller 230 may communicate data with devices 261 and 262 via PCIe links 264. The PCIe links 264 may use the PCIe connector to communicate data between the controller 230 and the devices 261 and 262. In one embodiment, the devices 261 and/or 262 may communicate data between the controller 230 and the disk drives 245. In another embodiment, the devices 261 and/or 262 may control the operation of the disk drives 245. In one embodiment, one or more of the devices 261 and/or 262 may implement RAID for one or more of the disk drives 245 (as discussed above).

The HBA 260 includes a PCIe configuration component 235. In one embodiment, the PCIe configuration component 235 may apply one or more signals to one or more lines (e.g., signal or data lines) of a PCIe connector (as illustrated in FIG. 4B). For example, the PCIe configuration component 235 may apply one or more signals to one or more reserved lines of the PCIe connector. The one or more signals may indicate bifurcation settings for the PCIe connector (as discussed above). The bifurcation settings may be based on the number of drives coupled to the devices 261 and 262 (as discussed above). In one embodiment, the controller 230 may receive the one or more signals and may select and/or retrieve different configurations (e.g., different bifurcation configurations) for the PCIe connector from the BIOS of the data storage device 220B (e.g., may read the configuration data from a memory of the BIOS). In one embodiment, the HBA 240 and/or the PCIe configuration component 235 may apply the one or more signals to the one or more of the PCIe connector based on one or more jumper settings (as discussed above).

The controller 230 may receive configuration data from the BIOS and may configure the PCIe links and/or PCIe lanes based on the configuration data (as discussed above). After the PCIe links and/or PCIe lanes are configured by the controller 230, the HBA 260 may communicate data between the devices 261 and 262, and the controller 230 via the PCIe links (as discussed above). For example, the HBA 260 includes a bus component 263. The bus component 263 may receive the data from the controller 230 on a PCIe link 264 and may provide the data to one or more of the devices 261 and 262. The bus component 263 may also receive data one or more of the devices 261 and 262 and may provide the data to the controller 230 via one or more PCIe links 264. Although two devices 261 and 262 are illustrated in FIG. 3, it shall be understood that in other embodiments, the HBA 260 may include more than two devices. Furthermore, although four disk drives 245 are illustrated in FIG. 3, it shall be understood that in other embodiments, the data storage device 220B may include any number of disk drives 245.

In one embodiment, the controller 230 may provide a clock signal to the clock component 265 of the HBA 260 via the PCIe connector. The clock component 265 may distribute, split, and/or provide the clock signal to the devices 261 and 262 (as discussed above). In another embodiment, the controller 230 may provide a reset signal to the HBA 260 via the PCIe connector. The HBA 260 may distribute, split, and/or provide the reset signal to the devices 261 and 262. In a further embodiment, the HBA 260 may receive power (e.g., a voltage) via the PCIe connector and may use the power to operate the devices 261 and/or 262.

Figure 4A:
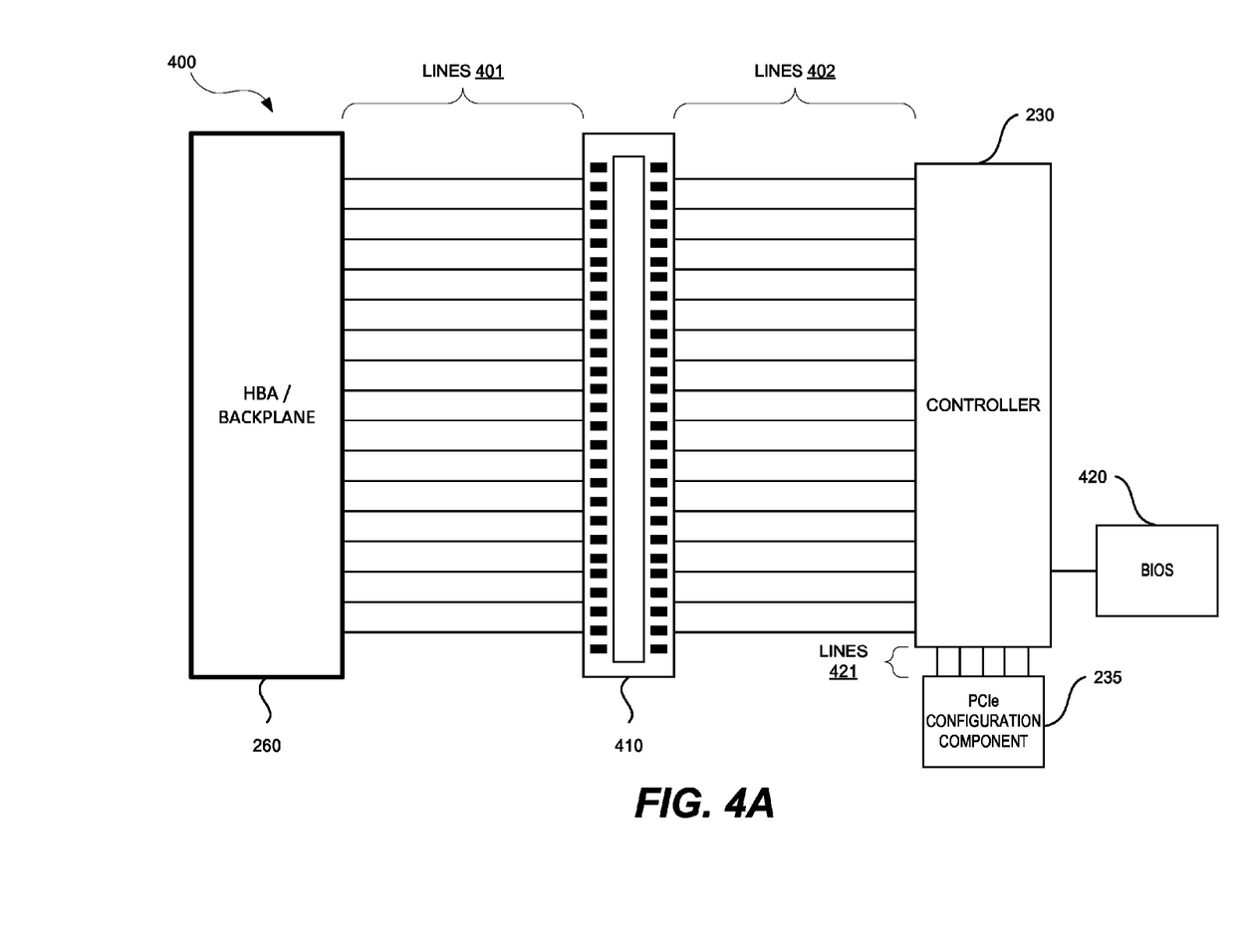
FIG. 4A is a diagram of a data storage device, according to an embodiment.
Figure 4B:
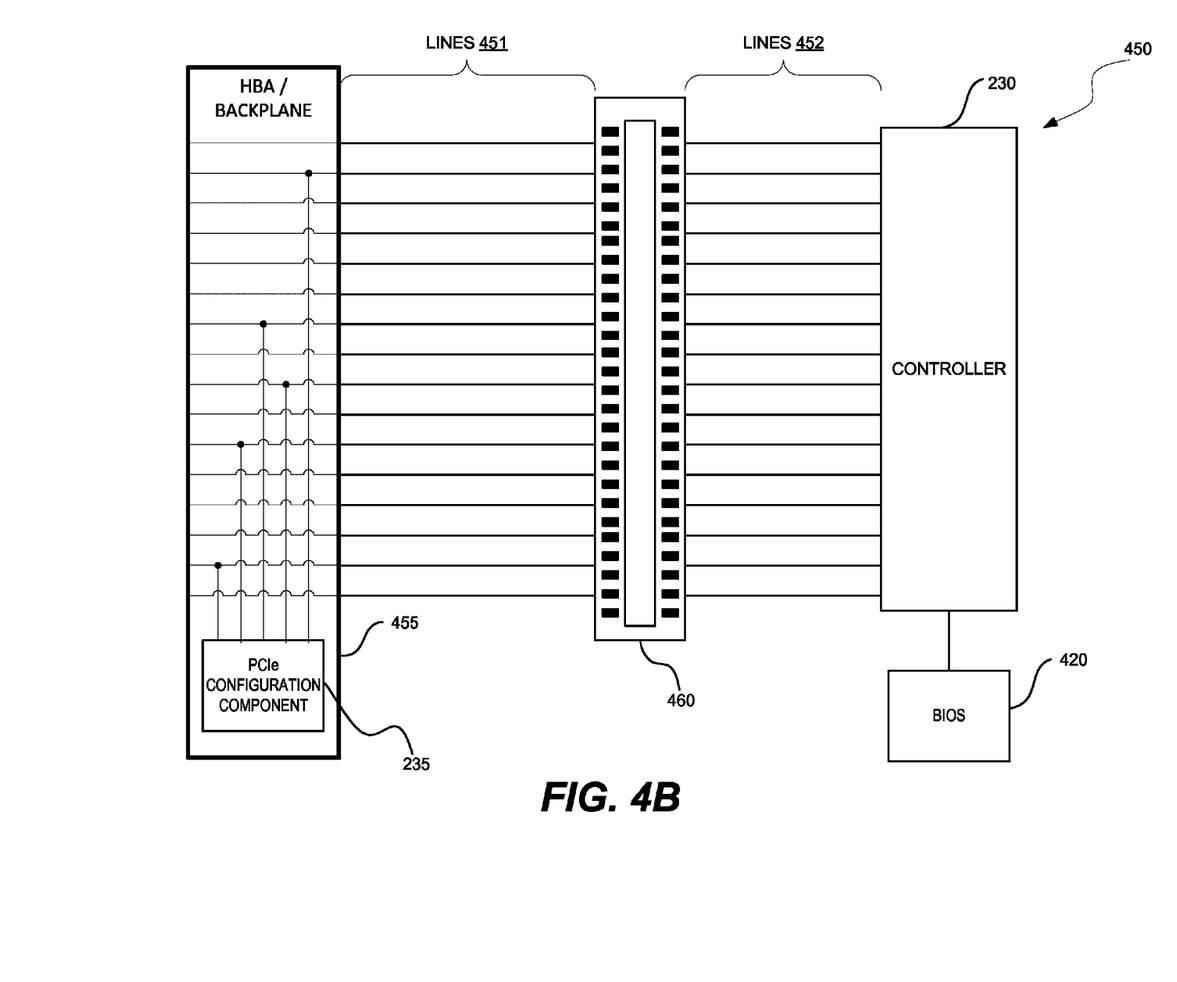
FIG. 4B is a diagram of a data storage device, according to an embodiment.

FIG. 4A is a diagram of a data storage device 400, according to an embodiment. The data storage device 400 includes an HBA 260. The HBA 260 may also be referred to as a backplane. As discussed above, the HBA 260 may include one or more devices (e.g., PCIe based devices or PCIe based SOCs). The HBA 260 may be plugged and/or inserted into a PCIe connector 410. For example, the HBA 260 may include lines 401 (e.g., lines, pins, wires, traces, etc.) that may be coupled, plugged, and/or inserted into the PCIe connector 410. The PCIe connector 410 may be coupled to the controller 230 via lines 402 (e.g., via lines, pins, wires, traces, etc.).

The controller 230 includes a PCIe configuration component 235. As discussed above, the PCIe configuration component 235 may apply one or more signals to lines 421 that are coupled to the controller 230. The one or more signals may indicate bifurcation settings for the PCIe connector. In one embodiment, the one or more signals may form a bit sequence/value (e.g., "10110") that indicates a number of PCIe links and/or a number of PCIe lanes for each PCIe link (e.g., 2 PCIe links with 4 lanes in each PCIe link). In another embodiment, the number of the one or more signals may indicate a number of PCIe links and/or a number of PCIe lanes for each PCIe link (as discussed above).

The controller 230 may retrieve configuration data based on the one or more signals received from the PCIe configuration component 235. For example, the BIOS 420 may include a memory and the controller 230 may access the memory (e.g., read the memory) to retrieve the configuration data. The controller 230 and/or the PCIe configuration component 235 may configure the PCIe links and/or PCIe lanes based on the configuration data. For example, the configuration data include parameters, settings, instructions, commands, etc., that the controller 230 and/or the PCIe configuration component 235 may use to configure the PCIe connector to a plurality of PCIe links, each with a number of PCIe lanes.

In one embodiment, the controller 230 may provide a clock signal to HBA 260 via the PCIe connector 410. The HBA 260 may distribute, split, and/or provide the clock signal to the devices 261 and 262 (as discussed above). In another embodiment, the controller 230 may provide a reset signal to the HBA 260 via the PCIe connector. The HBA 260 may distribute, split, and/or provide the reset signal to the devices 261 and 262. In a further embodiment, the HBA 260 may receive power (e.g., a voltage) via the PCIe connector and may use the power to operate one or more devices (e.g., PCIe based SOCs or PCIe based devices) coupled to the HBA 260.

FIG. 4B is a diagram of a data storage device 450, according to an embodiment. The data storage device 450 includes an HBA 260. The HBA 260 may also be referred to as a backplane. As discussed above, the HBA 260 may include one or more devices (e.g., PCIe based devices or PCIe based SOCs). The HBA 260 may be plugged and/or inserted into a PCIe connector 410. For example, the HBA 260 may include lines 451 (e.g., lines, pins, wires, traces, etc.) that may be coupled, plugged, and/or inserted into the PCIe connector 410. The PCIe connector 410 may be coupled to the controller 230 via lines 452 (e.g., via lines, pins, wires, traces, etc.).

The HBA 260 includes a PCIe configuration component 235. As discussed above, the PCIe configuration component 235 may apply one or more signals to lines 451 (which are coupled to the PCIe connector 410). The one or more signals may indicate bifurcation settings for the PCIe connector 410 (as discussed above). In one embodiment, the controller 230 may select and/or retrieve configuration data from the BIOS 420 based on the one or more signals. For example, the controller 230 may access a memory of the BIOS 420 to read the configuration data. The controller 230 may configure the PCIe links and/or PCIe lanes based on the configuration data.

In one embodiment, the controller 230 may provide one or more of a clock signal to HBA 260, a reset signal, and/or power via the PCIe connector 410. The HBA 260 may distribute, split, and/or provide the clock signal, the reset signals, and/or the power to one or more devices (e.g., PCIe based devices) coupled to the HBA 260 (as discussed above).

Figure 5:
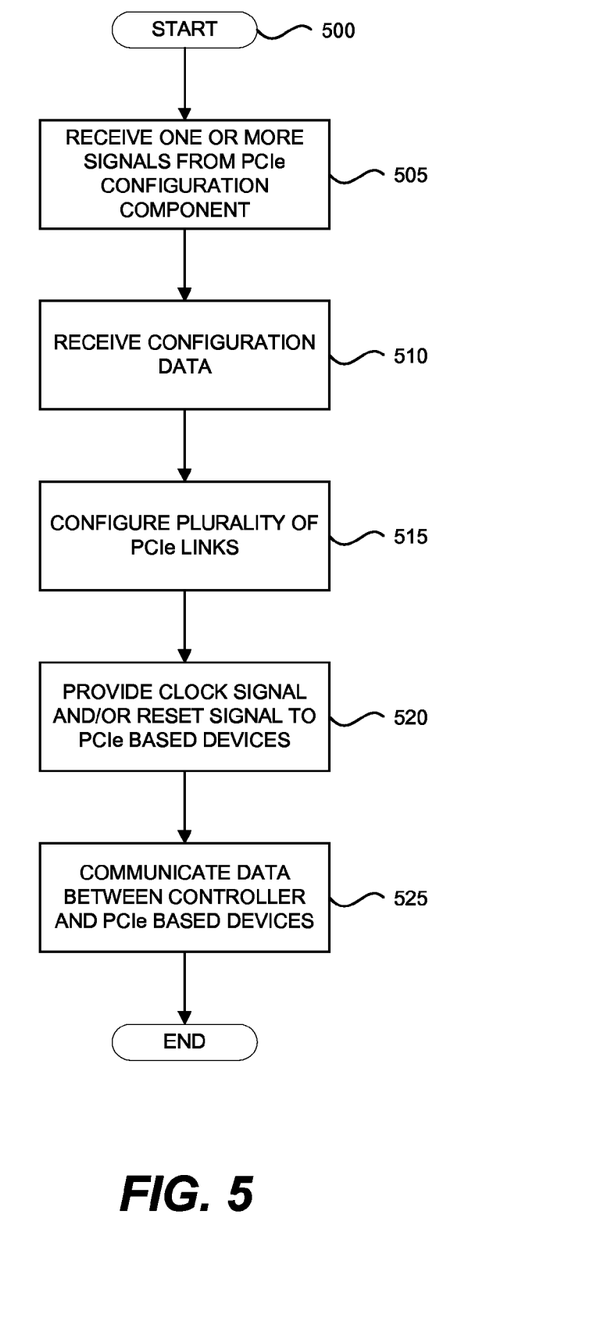
FIG. 5 is a flow diagram illustrating a process for configuration communication links, according to an embodiment.

FIG. 5 is a flow diagram illustrating a process 500 for configuring communication links, according to an embodiment. The process 500 may be performed by a controller and/or a PCIe configuration component, as illustrated and discussed above in conjunction with FIGS. 2, 3, and 4A. The controller and the PCIe configuration component may each include processing logic that includes hardware (e.g., circuitry, dedicated logic, programmable logic, microcode, etc.), software (e.g., instructions run on a processor to perform hardware simulation), firmware, or a combination thereof.

At block 505, the process 500 includes receiving one or more signals from one or more lines coupled to a PCIe configuration component. For example, referring to FIG. 4A, one or more signals may be received by the controller 230 via lines 421. As discussed above, the one or more signals may indicate bifurcation settings. For example, a number of the one or more signals and/or a bit sequence represented by the one or more signals may indicate the bifurcation settings. The process 500 includes receiving configuration data from the BIOS at block 510. For example, configuration data (including parameters, settings, instructions, and/or commands) may be accessed (e.g., read) from a memory of the BIOS. As discussed above, the configuration data may indicate how to configure a connector (e.g., a PCIe connector) to support a plurality of PCIe links (e.g., a plurality of communication links) and/or how to configure the plurality of PCIe links. At block 515, the process 500 includes configuring the plurality of PCIe links based on the configuration data. For example, the plurality of PCIe links may be configured using settings and/or commands in the configuration data.

The process 500 includes providing a clock signal and/or a reset signal to PCIe based devices at block 520. For example, referring to FIGS. 2 and 3, controller 230 may provide one or more of a clock signal and/or a reset signals to the HBA 260. The HBA 260 may split and/or provide the clock signal and/or reset signal to the devices 261 and 262. The process 500 may also include providing power to the HBA 260 via the connector. At block 525, the process 500 includes communicating data between the controller and one or more PCIe based devices. For example, referring to FIGS. 2 and 3, the controller 230 may communicate data (e.g., may transmit and/or receive data) with one or more of the devices 261 and 262 (which may be PCIe based devices such as PCIe based SOCs).

Figure 6:
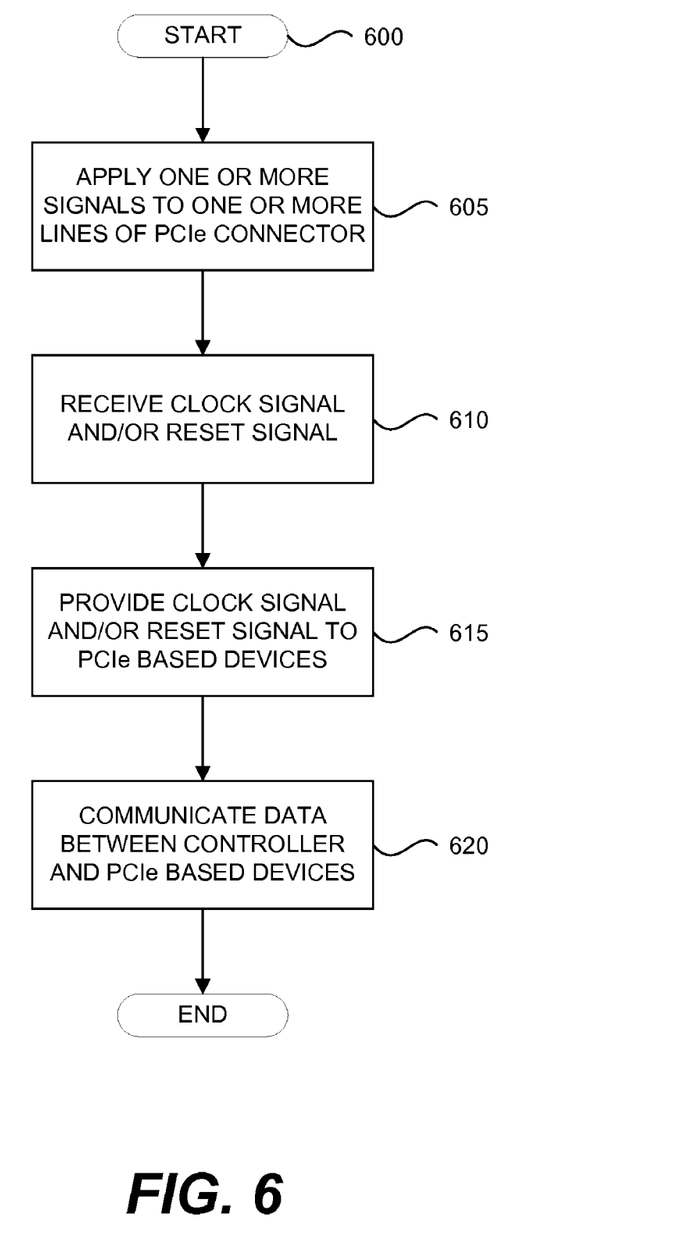
FIG. 6 is a flow diagram illustrating a process for configuring communication links, according to an embodiment.

FIG. 6 is a flow diagram illustrating a process 600 for configuration communication links, according to an embodiment. The process 600 may be performed by an HBA, a bus component, and/or a PCIe configuration component, as illustrated and discussed above in conjunction with FIGS. 2, 3, and 4B. The HBA, the bus component, and the PCIe configuration may each include processing logic that includes hardware (e.g., circuitry, dedicated logic, programmable logic, microcode, etc.), software (e.g., instructions run on a processor to perform hardware simulation), firmware, or a combination thereof.

At block 605, the process 600 includes applying one or more signals to one or more lines of a PCIe connector. For example, referring to FIG. 4B, one or more signals may be applied to lines 451. As discussed above, the one or more signals may indicate bifurcation settings. For example, a number of the one or more signals and/or a bit sequence represented by the one or more signals may indicate the bifurcation settings. In one embodiment, a controller may select and/or retrieve configuration data (e.g., parameters, settings, instructions, and/or commands) from a BIOS based on the one or more signals. For example, the controller may access (e.g., read) a memory of the BIOS to retrieve the configuration data. The controller may configure a connector (e.g., a PCIe connector) to support a plurality of PCIe links (e.g., a plurality of communication links) and/or configure the plurality of PCIE links (as discussed above).

At block 610, the process 600 includes receiving a clock signal and/or a reset signal. For example, referring to FIGS. 2 and 3, controller 230 may provide one or more of a clock signal and/or a reset signals to the HBA 260 (as discussed above). The process 600 may also include receiving power (e.g., a voltage) via the PCIe connector at block 610. The process 600 includes providing a clock signal and/or a reset signal to PCIe based devices at block 615. For example, referring to FIGS. 2 and 3, the HBA 260 may split and/or provide the clock signal and/or reset signal to the devices 261 and 262 (as discussed above). The process 600 may also include providing power to the devices at block 615. At block 620, the process 600 includes communicating data between the controller and one or more PCIe based devices. For example, referring to FIGS. 2 and 3, the HBA 260 may receive data from the controller 230 and may provide the data to one or more of the devices 261 and 262, and vice versa.

Additional Embodiments

Those skilled in the art will appreciate that in some embodiments, other types of distributed data storage systems can be implemented while remaining within the scope of the present disclosure. In addition, the actual steps taken in the processes discussed herein may differ from those described or shown in the figures. Depending on the embodiment, certain of the steps described above may be removed, others may be added.

While certain embodiments have been described, these embodiments have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. The accompanying claims and their equivalents are intended to cover such forms or modifications as would fall within the scope and spirit of the protection. For example, the various components illustrated in the figures may be implemented as software and/or firmware on a processor, ASIC/FPGA, or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this disclosure, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this disclosure and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc., as used herein are meant as labels to distinguish among different elements and may not necessarily have an ordinal meaning according to their numerical designation.

All of the processes described above may be embodied in, and fully automated via, software code modules executed by one or more general purpose or special purpose computers or processors. The code modules may be stored on any type of computer-readable medium or other computer storage device or collection of storage devices. Some or all of the methods may alternatively be embodied in specialized computer hardware.

What is claimed is:

1. A data storage device, comprising:
   a non-volatile memory;
   a multi-line serial computer expansion bus connector; and
   a controller coupled to the non-volatile memory, the controller configured to:
   receive one or more signals from one or more lines coupled to a configuration component, wherein the one or more signals comprise a bit sequence that is indicative of bifurcation settings for a multi-line serial computer expansion bus connector;
   receive configuration data based on the one or more signals; and
   configure a plurality of communication links based on the configuration data, wherein the plurality of communication links communicate data via the multi-line serial computer expansion bus connector.

2. The data storage device of claim 1, wherein a number of the one or more signals is indicative of the bifurcation settings.

3. The data storage device of claim 1, wherein the controller is further configured to:
   communicate data between the controller and a plurality of Peripheral Component Interconnect Express (PCIe) based devices via the plurality of communication links.

4. The data storage device of claim 1, wherein the bifurcation settings indicate one or more of a first number of communication links or a second number of lanes for each communication link of the plurality of communication links.

5. The data storage device of claim 1, wherein the one or more signals are applied based on one or more jumper settings of the data storage device.

6. The data storage device of claim 1, wherein the configuration data is received from a basic input/output system (BIOS) of the data storage device.

7. The data storage device of claim 1, wherein the multi-line serial computer expansion bus connector comprises a Peripheral Component Interconnect Express (PCIe) connector.

8. The data storage device of claim 3, wherein the multi-line serial computer expansion bus connector is coupled to a host bus adaptor (HBA) and wherein the plurality of PCIe based devices are coupled to the HBA.

9. The data storage device of claim 3, wherein the controller is further configured to:
provide a clock signal to the plurality of PCIe based devices.

10. The data storage device of claim 3, wherein the plurality of PCIe based devices receive one or more of a reset signal or power via the multi-line serial computer expansion bus connector.

11. A host bus adaptor (HBA), comprising:
a multi-line serial computer expansion bus connector; and
a bus configuration component configured to:
apply one or more signals to one or more lines of the multi-line serial computer expansion bus connector, wherein the one or more signals comprise a bit sequence that is indicative of bifurcation settings and wherein the one or more signals are provided to a controller; and
a bus component configured to:
communicate data between the controller and a plurality of Peripheral Component Interconnect Express (PCIe) based devices via a plurality of communication links, wherein the plurality of communication links communicate the data via the multi-line serial computer expansion bus connector.

12. The host bus adaptor of claim 11, further comprising: the plurality of PCIe based devices.

13. The host bus adaptor of claim 11, wherein the bifurcation settings indicate one or more of a first number of communication links or a second number of lanes for each communication link of the plurality of communication links.

14. The host bus adaptor of claim 11, wherein the one or more signals are applied based on one or more jumper settings of the host bus adaptor.

15. The host bus adaptor of claim 11, wherein the multi-line serial computer expansion bus connector comprises a Peripheral Component Interconnect Express (PCIe) connector.

16. The host bus adaptor of claim 12, further comprising:
a clock component configured to receive a clock signal and provide the clock signal to the plurality of PCIe based devices.

17. The host bus adaptor of claim 12, wherein the plurality of PCIe based devices receive one or more of a reset signal or power via the multi-line serial computer expansion bus connector.

18. A method comprising:
receiving one or more signals from one or more lines coupled to a configuration component, wherein the one or more signals comprise a bit sequence that is indicative of bifurcation settings for a multi-line serial computer expansion bus connector;
receiving configuration data based on the one or more signals; and
configuring a plurality of communication links based on the configuration data.

19. The method of claim 18, further comprising:
communicating data between a controller and a plurality of Peripheral Component Interconnect Express (PCIe) based devices via the plurality of communication links.

20. The method of claim 18, wherein the multi-line serial computer expansion bus connector comprises a Peripheral Component Interconnect Express (PCIe) connector.

21. The method of claim 18, wherein the one or more signals are applied based on one or more jumper settings of the configuration component.

22. The method of claim 19, further comprising:
providing one or more of a clock signal or a reset signal to the plurality of PCIe based devices.

23. A data storage device, comprising:
a non-volatile memory;
a multi-line serial computer expansion bus connector; and
a controller coupled to the non-volatile memory, the controller configured to:
receive one or more signals from one or more lines coupled to a configuration component, wherein:
the one or more signals are indicative of bifurcation settings for a multi-line serial computer expansion bus connector; and
the one or more signals are applied based on one or more jumper settings of the data storage device;
receive configuration data based on the one or more signals; and
configure a plurality of communication links based on the configuration data, wherein the plurality of communication links communicate data via the multi-line serial computer expansion bus connector.

* * * * *